Jan. 6, 1970  F. E. BAYLIS  3,487,617
RAKE
Filed April 18, 1967

*INVENTOR*
FRANK E. BAYLIS

United States Patent Office 3,487,617
Patented Jan. 6, 1970

3,487,617
RAKE
Frank E. Baylis, 221 Richmond Ave.,
West Haven, Conn. 06516
Filed Apr. 18, 1967, Ser. No. 631,767
Int. Cl. A01d 7/00; A01b 1/00
U.S. Cl. 56—400.01                          5 Claims

ABSTRACT OF THE DISCLOSURE

This novel invention of mine consists of a handle, or its equivalent, that has one end secured in the center of a bar of any desired length, the bar being at right angle to the aforesaid handle. A plurality of teeth, that are in equal and parallel spaced relation to one another, project downward from the underside of the aforesaid bar. Each tooth is provided with a plurality of equally spaced and parallel flexible or rigid fingers of any size or shape that are at right angle or oblique angle to the teeth. The plurality of flexible or rigid fingers on the odd numbered teeth are located between the plurality of flexible or rigid fingers on the even numbered teeth, as one can see from examination of the two fingers of the appended drawing of this invention.

---

This invention relates to a tool used in agriculture, which is the science pertaining to tillage, and more particularly the invention relates to that tool of agriculture known through the ages as a rake, one of man's oldest implements for cultivation of the earth.

It is the principal object of this invention to provide a rake of the character described that will have structure in the form of flexible or rigid fingers which will stop small debris from going between the teeth while the rake is being used.

Another object of this invention is to provide a rake of the character described that will not become clogged with a lot of small debris between the teeth, debris one must stop and clean out of the rake from time to time.

Still another object of this invention is to provide a rake of the character described that can be manufactured in any size, or material, and with curved as well as straight or tapered teeth.

Other and further objects and advantages of this rake will become apparent as the reading of the construction of the rake proceeds and the appended claims are read and the attached drawing is examined.

In the drawing.

In the drawing, like parts are indicated by like reference numbers in the two views.

Figure 1:
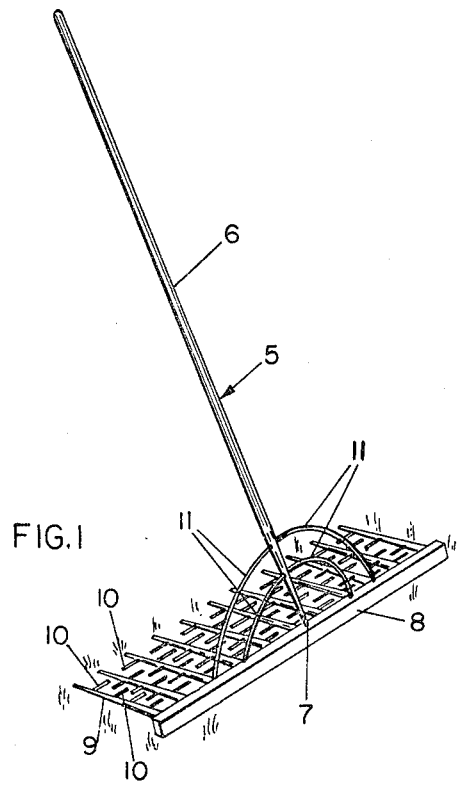
FIG. 1 is a pictorial view of this invention provided with handle for manual use of the rake or without handle for power use.
Figure 2:
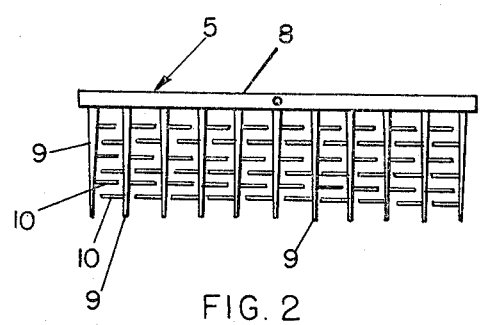
FIG. 2 is a front view of this invention of a rake.

The reference number 5 indicates this invention of a rake in its entirety.

The rake consists of a handle 6 having one end 7 terminating in the center of the bar 8 which is at right angle to the aforesaid handle 6. A plurality of tapered or straight shaped teeth 9 project outward at right angle, in equal and parallel spaced relation to one another, from the aforesaid bar 8. Each tooth 9 is provided with a plurality of equally spaced and parallel flexible or rigid fingers 10 which are in turn at right or oblique angle to the aforesaid teeth 9 and parallel to the aforesaid bar 8. The plurality of fingers 10 are so located on the teeth as to actually be located between one another as one can readily see on examination of the attached drawing. Obviously, the aforesaid handle 6, bar 8, and the teeth 9 are made from some rigid material such as steel or some other metal although they can be made from plastic or any other desired material.

This novel rake 5 is also provided with a plurality of spaced brace members 11, which are connected to both the aforesaid handle 6 and the bar 8, in order to provide greater stability to the invention.

From the foregoing, it is seen that I have provided a rake of the character described which fulfills all of the objects of this invention, the invention being subject to any and all changes and/or modifications one may care to make.

What I now claim as new and desire to secure by Letters Patent is:

1. A rake of the character described, comprising structure for movement of the said rake, the said structure having one end terminating in a bar from the underside of which downwardly extends a plurality of teeth, each tooth being provided with a plurality of fingers, each finger secured at one end to its tooth, the end teeth having fingers extending toward the adjacent tooth while each intermediate tooth has two sets of fingers, one set extending toward an adjacent tooth and the other set extending toward the other adjacent tooth.

2. The invention of claim 1, wherein the said structure is in the form of a hand held handle.

3. The invention of claim 2, wherein each finger extends substantially at right angle to its tooth.

4. The invention of claim 3, wherein each finger extends nearly to the adjacent tooth.

5. The invention of claim 4, wherein the fingers extending toward adjacent teeth are between one another.

References Cited

UNITED STATES PATENTS

| 491,703 | 2/1893 | Felix | 56—400.8 |
| 623,708 | 4/1899 | Ensley | 56—400.11 |
| 1,130,789 | 3/1915 | Barrie | 56—400.11 |
| 1,639,777 | 8/1927 | Lewis | 172—766 X |
| 2,036,807 | 4/1936 | Honn | 56—400.01 |
| 3,110,349 | 11/1963 | Means | 172—379 |

RUSSELL R. KINSEY, Primary Examiner

U.S. Cl. X.R.

172—379